Patented Mar. 21, 1950

2,501,525

UNITED STATES PATENT OFFICE 2,501,525

METHOD OF PREPARING ORGANO-POLYSILOXANES

Robert H. Krieble and John R. Elliott, Schenectady, N. Y., assignors to General Electric Company, a corporation of New York No Drawing. Application August 27, 1946,
Serial No. 693,377

5 Claims. (Cl. 260—46.5)

This invention relates to an improved method of preparing organopolysiloxanes. It is more particularly concerned with an improved method of hydrolyzing a mixture of organo - substituted halogenosilanes capable of forming a resin upon hydrolysis and condensation wherein one of the aforementioned halogenosilanes is a monovalent hydrocarbon-substituted halogenosilane.

An object of this invention is to provide a controlled method of hydrolyzing compositions containing one or more organo-halogenosilanes, i. e., compounds having the general formula $$R_n SiX_{4-n}$$

wherein R represents a monovalent hydrocarbon radical, X represents a halogen atom, for example chlorine, bromine, etc., and $n$ is a whole number and is equal to at least 1 and not more than 3, to form polysiloxane resins.

Another object of the invention is to provide a method of preparing organo-silicon (organopolysiloxane) resins which can be converted to the substantially infusible and insoluble state in a comparatively shorter time than is required to cure polysiloxane resins made by the usual hydrolysis methods now employed in the art.

A further object of the invention is to provide a practical method of hydrolyzing mixtures of halogenosilanes containing a hydrocarbon-substituted halogenosilane having three halogens attached directly to the silicon atom whereby the desired organo-silicon resinous materials may be obtained without substantially any gel formation and whereby the aforementioned resinous materials are soluble in polar solvents (for instance, alcohols, e. g., ethyl alcohol, etc., ketones, e. g., acetone, etc.) to an extent equal to at least about 90 to 95 per cent of the hydrolyzed resinuous product.

Still another object of the invention is to provide a method of hydrolyzing mixtures comprising organohalogenosilanes, which method requires only water as the hydrolyzing medium, thus eliminating the use of expensive and hazardous solvents.

It was known prior to our invention that organohalogenosilanes, e. g., hydrocarbon-substituted halogenosilanes, could be readily hydrolyzed. In order to decrease the rate of hydrolysis and subsequent condensation of the hydroxy products in the preparation of the polysiloxane resins and thereby prevent or substantially prevent gelling of the products during the hydrolysis reaction, the hydrolysis step has been carried out by adding dilute solutions of the halogenosilanes in a solvent comprising ether (which is quite volatile and inflammable) to ice or mixtures of ice and water. The use of diethyl ether for this purpose is disclosed, for example in Rochow Patent 2,258,218 and in Rochow application Serial No. 393,843, filed May 16, 1941, now abandoned, the aforementioned patent and application being assigned to the same assignee as the instant application.

Sauer Patent 2,398,672, also assigned to the same assignee, relates to the hydrolysis of organosubstituted halogenosilanes capable of forming a resin upon hydrolysis and condensation wherein the organo-substituted halogenosilanes are first dissolved in an inert organic solvent, e. g., toluene, and this solution is thereafter hydrolyzed by slowly adding it to a two-phase hydrolysis medium comprising water considerably in excess of that required for complete hydrolysis of the halogenosilanes, and e. g. an aliphatic alcohol containing at least 4 and not more than 8 carbon atoms. Although liquid resinous products can be obtained by the aforementioned methods of hydrolysis, the resinous products obtained thereby require extended periods of time at elevated temperatures to convert them to the hard, infusible, and insoluble state. Even though catalysts have been used for accelerating the cure of these silicone resins, it has been necessary to subject molded products comprising these resins to an after-bake at elevated temperatures for additional periods of time to cure the resin more satisfactorily. Furthermore, since these methods require the use of large volumes of relatively expensive solvents, it is necessary to reclaim the solvents in any large scale commercial project. The large scale reclamation involves in some measure a direct fire hazard due to the inflammability of the solvents employed.

The present invention is based on our discovery that organopolysiloxane resins of improved, i. e., having accelerated, curing characteristics may be obtained from a mixture of halogenosilanes substantially free of solvent and capable of forming a resin upon hydrolysis and condensation, said mixture containing at least one monovalent hydrocarbon-substituted halogenosilane (preferably a mixture containing at least 50 or more mol per cent of a monohydrocarbon-substituted trihalogenosilane, for example methyl trichlorosilane, ethyl trichlorosilane, etc., which method comprises directing the mixture of halogenosilances into a violently agitated or turbulently stirred zone of a hydrolysis medium comprising a slurry of ice and water maintained at a temperature below substantially 5° C. during essentially the entire addition of the halogenosilanes.

The method whereby the above-described hydrolysis is effected may be varied in different manners. It is essential that a high degree of turbulence and agitation be maintained at the point of entry of the chlorosilanes into the mixture of ice and water. Propeller-type stirrers revolving at a high speed, preferably over 500 revolutions per minute, e. g. from about 500 to 1500 revolutions per minute, may be immersed in the mixture of ice and water (the ice preferably being present in small pieces) and the stream of chlorosilanes directed into the violently agitated zone. One effective method for introducing the halogenosilanes comprises leading the stream of halogenosilanes directly into the blades of the rapidly revolving stirrer immersed in the ice and water slurry or mixture. One of the main objects of the fast stirring is to prevent high local concentrations of the hydrogen halide from forming. In addition, it is desirable that the mixture of halogenosilanes be added as rapidly as possible in order to maintain for as short a period of time as possible the concurrent presence of $$-\underset{|}{\overset{|}{Si}}-X \text{ and } -\underset{|}{\overset{|}{Si}}-OH$$

groups, where X is a halogen.

The amount of water present in the ice water mixture will be considerably in excess of that calculated as necessary for complete hydrolysis of the mixture of halogenosilanes. Ordinarily, on a weight basis, the amount of water employed may be varied from about 3 to 25 or more times the weight of the mixture of halogenosilanes. In the case of the hydrolysis of methyl chlorosilanes, we obtain good results when the proportion by weight (of water to mixture of chlorosilanes) is from about 5 to 1 to as high as 12 to 1. The amount of ice present should be at least equal to that necessary to neutralize the heat of hydrolysis of the halogenosilanes and still maintain the temperature of the hydrolysis medium below substantially 5° C. during essentially the entire hydrolysis, the actual amount present being determined by such factors as for example the amount of halogenosilanes (organo-substituted halogenosilanes), length of time required for addition of the halogenosilanes, rate of addition of the halogenosilanes, the requirements for temperature maintenance, etc. When the mixture of halogenosilanes contains by weight, e. g., at least 50 mol per cent of a monohydrocarbon-substituted trihalogenosilane, good results are obtained when the amount of ice present varies from about 4 to 8 or more times the weight of the halogenosilanes.

The use of too little water may result in excessive gel formation. This may be due to the resulting differences in acid concentration in the resulting resinous layer, which acid concentration is proportionately dependent upon the concentration of the hydrogen halide in the aqueous layer or phase. If the acid concentration in the subsequently formed resinous layer is too high, as when too little water is used, the silanol groups may be condensed more rapidly. The reactions theoretically involved during the course of the hydrolysis of the organohalogenosilanes, for example the organo-chlorosilanes, are believed to be essentially the following:

(1) 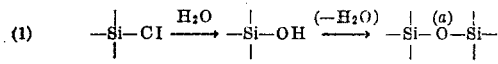

The rates of hydrolysis of the halogenosilanes under optimum conditions of hydrolysis are in general faster than the rates of condensation (splitting out of water) of the silanols to form the polysiloxane skeletal structures [see (a) in Equation 1].

From a study of the hydrolysis of methylchlorosilanes, it is believed that the rate of dehydration of the methyl silanols to form a methyl polysiloxane resin increases rapidly with increasing hydrogen halide concentration. Therefore, when the acid concentration is at all appreciable, few silanol groups remain. We have found that by keeping the concentration (weight) of the hydrogen halide below 10 to 12 per cent of the weight of the hydrolysis medium (ice and water), the number of silanol groups will be substantially increased; stated alternatively, the lower concentration of the hydrogen halide results in a polysiloxane resin containing a substantial number of hydroxyl groups attached to the silicon atoms.

The use of excessive water in the hydrolysis medium is not particularly advantageous since longer periods of time are then required for the water mixture of hydrolyzed halogenosilanes to separate into an aqueous phase and a resinous phase. In the practice of our claimed process of hydrolysis, the water will become turbid upon completion of the addition of the halogenosilanes (i. e., a turbid sol will develop); thereafter the mixture will turn rapidly milky and soon separate into an aqueous layer and a resinous layer.

The temperature of the ice and water should be maintained throughout essentially the entire addition of the halogenosilanes below substantially 5° C. This may require further additions of ice to the ice water hydrolysis medium while the hydrolysis of the halogenosilanes is continuing. If desired, after the hydrolysis is completed, organic solvents (for example, ethyl acetate, etc.) capable of taking up the formed polysiloxane resin may be added to the hydrolyzed mass and the organic layer separated from the water. However, this is not essential since it is possible to separate the water layer and any remaining ice from the resinous product to yield a resinous condensation product substantially completely soluble in ethyl alcohol.

In order that those skilled in the art may better understand how the present invention may be practiced, the following examples are given by way of illustration and not by way of limitation. All parts are by weight.

EXAMPLE 1

Thirty parts methyl trichlorosilane was run into the blades of a high speed stirrer (revolving about 500 revolutions per minute) submerged in a slurry comprising 180 parts of crushed ice and 320 parts water. The addition of the chlorosilane required about 2 minutes. At the end of the addition, the temperature was −2° C. A slightly turbid sol was formed which deposited a sticky, taffylike resin on the walls of the container after standing for a few hours at room temperature. The methyl polysiloxane resin obtained in the above manner was soluble in acetone and ethyl alcohol.

EXAMPLE 2

In this example, 3000 parts of a mixture comprising, by weight, approximately 81 per cent methyl trichlorosilane and 19 per cent dimethyl dichlorosilane was run into the blades of a high speed (lightnin') stirrer submersed in a slurry comprising 18,000 parts crushed ice and 15,000 parts water. The addition was completed in about 7 minutes at which time the temperature was −3° C. After standing for 4 hours at room temperature, a resin was deposited on the bottom of the vessel. The aqueous acid, i. e., the aqueous layer containing the hydrogen chloride liberated by the hydrolysis of the chlorosilanes, was decanted and the resin washed several times with water at about 70° C. The resin obtained in this manner was a translucent, plastic solid completely soluble in the common polar organic solvents such as e. g., ethyl alcohol, acetone, ethyl acetate, etc. The resin cured, i. e., was converted to a substantially hard, insoluble, and infusible mass in less than 4 minutes when a sample was placed on a 150° C. hot plate.

A resin prepared by hydrolyzing a mixture of chlorosilanes comprising, by weight, 90 percent methyl trichlorosilane and 10 per cent dimethyl dichlorosilane according to the method of Sauer (supra) was still liquid after one-half hour when a sample of the resin was placed on a 150° C. hot plate. The comparison of curing properties of this resin with the curing properties of the resin made according to our process is more striking when one considers that the former resin is of higher functionality than is the resin prepared according to our process due to the higher proportion of methyl trichlorosilane in the hydrolyzable mixture. The higher functionality should increase the ease with which cross-linking or insolubility and infusibility are obtained and also decrease the time for the attainment of this state, all other factors being equal.

EXAMPLE 3

A mixture of chlorosilanes comprising 300 parts, by weight, and containing 50 mol per cent methyl trichlorosilane and 50 mol per cent dimethyl dichlorosilane was hydrolyzed in the same fashion as in Example 2. A turbid sol was produced which deposited a liquid polysiloxane (silicone) resin after standing for 18 hours at room temperature. The resin obtained by separating the resinous liquid from the aqueous layer and washing it several times with water was soluble in polar solvents such as ethyl alcohol, acetone, etc., and cured to a substantially insoluble, infusible state in approximately 8 minutes when a sample of the resin was placed on a 150° C. hot plate. When 20 per cent by weight zinc oxide was incorporated in the resin, the cure of the pigmented resin was less than one minute. When equal amounts of resin and zinc oxide were blended and thinned to a suitable viscosity with toluene, the solution could be applied as a lacquer to a copper panel, baked for one hour in a 150° C. oven to yield a hard film which was unaffected by immersion for one-half hour in organic solvents such as benzene and acetone.

EXAMPLE 4

Three hundred parts of a mixture containing 85 mol per cent methyl trichlorosilane, 10 mol per cent dimethyl dichlorosilane, and 5 mol per cent phenyl trichlorosilane was hydrolyzed in the same manner as employed in Example 2 using similar proportions of ice and water. A sticky resin, completely soluble in acetone, was precipitated on short standing. This resin could be cured to the infusible, insoluble state in less than 5 minutes at 150° C.

EXAMPLE 5

To illustrate the use of a resin obtained by our method in molding compositions, 130 parts of the resin prepared according to the method disclosed in Example 2 was dissolved in acetone. To this solution was added 130 parts of dry asbestos "floats" and a homogeneous mixture of the two ingredients was prepared. The paste thus formed was evaporated to dryness at room temperature and pulverized by passage through a disintegrator. The powder was precured for 30 minutes in a 100° C. oven. About 40 parts of the powder was charged to a preheated mold capable of molding bars 5″ x ½″ x ½″ and pressed for 15 minutes at 150° C. and 10,000 p. s. i. At the end of this time the bar was easily removed from the mold and found to be quite strong and hard. The surface of the bar was smooth and glossy and the edges were sharp. The bar, which was cured further for 1 hour in a 200° C. oven, was found to have a Charpy impact strength (unnotched) of 0.54 ft. lb. Another 25 parts of the molding powder was placed in a preheated cup mold of the flash type and pressed for 30 minutes at 150° C. under a pressure of above 5000 p. s. i. The mold was opened hot and a perfect piece was readily ejected hot. The cup could be after-baked at a temperature above 200° C. without deformation.

Methyl polysiloxanes employing substantially the same chlorosilanes as used in this example, but hydrolyzed according to the method disclosed and claimed in the above-mentioned Sauer patent (supra), cannot be successfully used as binders for asbestos wherein the molding cycle is at such a low temperature and short period of time as used above. When an attempt is made to mold a cup using a molding material containing a polysiloxane resin prepared by a solvent hydrolysis and the above curing cycle is employed, the pin used to eject the molded piece from the mold brakes through the bottom of the cup due to the undercured state of the resin employed.

EXAMPLE 6

Two methyl polysiloxane resins solutions were prepared as follows:

Resin A

A mixture of methyl chlorosilanes comprising by weight about 90 per cent methyl trichlorosilane and 10 per cent dimethyl dichlorosilane was hydrolyzed according to the process disclosed and claimed in Sauer Patent 2,398,672, issued April 16, 1946, and assigned to the same assignee as the present invention, using toluene, $n$-butanol, and water as the hydrolysis medium. The upper toluene solution of the resin was removed and washed with water several times. The resin content of the solution was thereafter adjusted to a solids content of about 30 per cent.

Resin B

A mixture of methyl chlorosilanes comprising by weight about 80 per cent methyl trichlorosilane and 20 per cent dimethyl dichlorosilane was directed in the form of a thin stream into a violently agitated zone of a mixture comprising ice and water using a high speed stirrer as the source of agitation. The amount of water present was considerably in excess of that calculated as necessary to hydrolize completely all the methyl chlorosilanes in the mixture. Throughout the addition of the chlorosilanes, the temperature of the hydrolysis medium was maintained around 0° C. The resinous layer which settled to the bottom was separated from the water layer and washed several times with water and thereafter dissolved in a solvent comprising about equal parts benzene and ethyl acetate.

The solids content of this solution was between 26 to 30 per cent.

Each of the above resin solutions was thoroughly mixed with a filler comprising asbestos "floats" to produce a mixture containing by weight about 30 per cent resin (as the binder) and approximately 70 per cent filler. The solvent was removed from each mixture by evaporation and the molding composition obtained was ground to a size suitable for molding purposes.

Samples of each of the molding compounds prepared above were molded in a bar mold at a temperature of approximately 170° C. for 10 minutes at about 2500 p. s. i. The molded samples employing Resin A as the binder were weak structurally and were quite rubbery and soft when removed from the mold indicating that they were undercured. In addition, these samples stuck to the walls of the mold and were removed only with great difficulty. It was decided that it was useless to test these samples because of their poor strength at room temperature. The samples employing Resin B as the binder, on the other hand, were firm and could be removed easily from the molds without any portion thereof sticking to the walls.

In order to compare the strength properties of the molded pieces using the resin prepared according to our claimed invention to the strength properties of the molded pieces prepared using Resin A, it was necessary to mold the latter pieces at about 260° C. for about one-half hour. The latter molding cycle, i. e., one-half hour at 260° C., was employed at varying pressures to determine whether molded samples using Resin A as the binder would have properties corresponding to the properties of samples employing Resin B as the binder and molded at a lower temperature and pressure. The following table shows the results of tests conducted on samples of each of the molding compounds:

halogenosilanes, the invention is broadly applicable to the hydrolysis of any organohalogenosilane of the formula $$R_nSiX_{4-n}$$

wherein R represents a monovalent substituted or unsubstituted saturated aliphatic or aromatic hydrocarbon radical (many examples of which are given in the aforementioned Sauer Patent 2,398,672), X represents a halogen, e. g., chlorine, bromine, etc., and $n$ is a whole number and is at least 1 and not more than 3. Mixtures of halogenosilanes, e. g., a mixture of organohalogenosilanes comprising methyl trichlorosilane, dimethyl dichlorosilane, and phenyl trichlorosilane, as illustrated in Example 4, may also be hydrolyzed in accordance with our invention. Although the preferred embodiments of the invention call for a mixture of hydrocarbon-substituted halogenosilanes, especially a mixture of halogenosilanes containing at least 50 mol per cent of a monovalent hydrocarbon-substituted trihalogenosilane, it will of course be understood that tetrafunctional silanes, e. g., tetrahalogenosilanes, may also be incorporated to give the desirable results obtainable by the practice of our invention. Good results are obtained when the mixture of halogenosilanes comprises from 50 to 80 mol per cent of a monohydrocarbon-substituted trihalogenosilane and from 20 to 50 mol per cent of a dihydrocarbon-substituted dihalogenosilane.

The resinous polysiloxanes obtained by means of our improved hydrolysis process which possess the improved solubility and curing characteristics may be used in any of the numerous applications for which polysiloxane resins have previously been employed. A number of these applications are set forth for example in Rochow Patents 2,258,218–222 assigned to the same assignee as the present invention. Certain of the polysiloxanes prepared by this process are particularly

*Table*

| Sample No. | Binder Resin No. | Molding Pressure, p. s. i. | Flexural Strength, p. s. i. | Izod Impact ft. lbs./in. of Notch | Compressive Strength | |
|---|---|---|---|---|---|---|
| | | | | | Face, p. s. i. | Side, p. s. i. |
| 6a | A | 3,000 | 1,220 | 0.62 | 8,500 | 8,750 |
| 6b | A | 5,000 | 1,990 | 0.50 | 11,620 | 9,800 |
| 6c | A | 7,000 | 2,150 | 0.55 | 11,900 | 9,280 |
| 6d | A | 10,000 | 2,646 | 1.25 | 15,560 | 10,836 |
| 6e | B | 2,500 | 4,900 | 1.08 | 15,670 | 13,800 |
| 6f [1] | B | 2,500 | 4,400 | 1.34 | 17,170 | 14,890 |
| 6g [2] | A | 10,000 | 2,650 | 1.10 | 15,930 | 10,200 |
| 6h [3] | A | 10,000 | 2,760 | 1.10 | 13,800 | 13,800 |
| 6i [4] | B | 2,530 | 4,000 | 1.00 | 13,760 | 10,060 |

[1] The molded samples were after-baked for 24 hours at 200° C. and for 4 hours at 110° C.
[2] In this case the molded samples were after-baked for 24 hours at 170° C.
[3] The samples were after baked for 9 days at 170° C.
[4] In this example, the molding composition comprised about 30 per cent resin, 50 per cent asbestos "floats" and 20 per cent zinc oxide, all the ingredients being present in percentages by weight.

The above results show that even though Resin A is of a higher functionality than is Resin B, the properties of the molded samples using the latter resin are generally much better than the properties of the samples using Resin A. Even higher molding temperatures and higher pressures failed to yield a product (employing Resin A as the binder) comparable to the product obtained using Resin B.

It will be understood by those skilled in the art that although our invention has been described with particular reference to the preparation of polysiloxane resins from certain specific organoamenable to further treatment in accordance with the catalytic process described and claimed in Wright et al. Patent 2,389,477, also assigned to the instant assignee. Other catalysts capable of accelerating the cure of the resinous polysiloxanes may also be added, preferably in small amounts. These include, for instance, zinc oxide, metal naphthenates, e. g., lead naphthenate, lead oxide, hydrochloric acid, ethyl borate, etc.

One of the important results of our invention is that heat-curable resinous polysiloxanes can be satisfactorily molded using curing cycles comparable to those employed in molding phenolic condensation products. This eliminates the requirement for expensive high temperature molding equipment and in addition gives easily moldable products having the high arc resistance, outstanding dielectric strength, and good heat resistance characteristic of resinous polysiloxanes.

What we claim as new and desire to secure by Letters Patent of the United States, is:

1. The method of making a polysiloxane resin from a mixture of organohalogenosilanes containing at least 50 mol per cent methyltrichlorosilane and a chlorosilane containing two monovalent hydrocarbons attached to the silicon atom by a C-Si bond, said mixture being free of solvent and capable of forming a resin upon hydrolysis and condensation, which method comprises (1) providing a violently agitated zone in a hydrolysis medium consisting of ice and water and rapidly introducing the mixture of organohalogenosilanes into such zone while maintaining an amount of ice in said hydrolysis medium equal, by weight, to at least four times the weight of the mixture of organohalogenosilanes so as to maintain the temperature of the aforesaid hydrolysis medium substantially below 5° C. throughout the addition of the organohalogenosilanes, the concentration of the HCl resulting from the hydrolysis step being maintained below 12 per cent of the weight of the hydrolysis medium, and (2) separating the thereby formed water-insoluble polysiloxane to obtain an ethyl alcohol-soluble product.

2. The method of making a polysiloxane resin from a mixture of organohalogenosilanes containing at least 50 mol per cent methyltrichlorosilane and free of solvent and capable of forming a resin upon hydrolysis and condensation, which method comprises (1) providing a violently agitated zone in a hydrolysis medium consisting of ice and water and rapidly introducing the mixture of organohalogenosilanes into such zone while maintaining an amount of ice in said hydrolysis medium equal, by weight, to at least four times the weight of the mixture of organohalogenosilanes so as to maintain the temperature of the aforesaid hydrolysis medium substantially below 5° C. throughout the addition of the organohalogenosilanes, the concentration of the HCl resulting from the hydrolysis step being maintained below 12 per cent of the weight of the hydrolysis medium, and (2) separating the thereby formed water-insoluble polysiloxane to obtain an ethyl alcohol-soluble product.

3. The method of making a polysiloxane resin from a mixture of organohalogenosilanes containing (a) at least 50 mol per cent methyltrichlorosilane and (b) dimethyldichlorosilane, said mixture being free of solvent and capable of forming a resin upon hydrolysis and condensation, which method comprises (1) providing a violently agitated zone in a hydrolysis medium consisting of ice and water and rapidly introducing the mixture of organohalogenosilanes into such zone while maintaining an amount of ice in said hydrolysis medium equal, by weight, to at least four times the weight of the mixture of organohalogenosilanes so as to maintain the temperature of the aforesaid hydrolysis medium substantially below 5° C. throughout the addition of the organohalogenosilanes, the concentration of the HCl resulting from the hydrolysis step being maintained below 12 per cent of the weight of the hydrolysis medium, and (2) separating the thereby formed water-insoluble polysiloxane to obtain an ethyl alcohol-soluble product.

4. The method of making a polysiloxane resin from a mixture of organohalogenosilanes containing (a) at least 50 mol per cent methyltrichlorosilane, (b) dimethyldichlorosilane, and (c) phenyltrichlorosilane, said mixture being free of solvent and capable of forming a resin upon hydrolysis and condensation, which method comprises (1) providing a violently agitated zone in a hydrolysis medium consisting of ice and water and rapidly introducing the mixture of organohalogenosilanes into such zone while maintaining an amount of ice in said hydrolysis medium equal, by weight, to at least four times the weight of the mixture of organohalogenosilanes so as to maintain the temperature of the aforesaid hydrolysis medium substantially below 5° C. throughout the addition of the organohalogenosilanes, the concentration of the HCl resulting from the hydrolysis step being maintained below 12 per cent of the weight of the hydrolysis medium, and (2) separating the thereby formed water-insoluble polysiloxane to obtain an ethyl alcohol-soluble product.

5. The method of making a polysiloxane resin from a mixture of organohalogenosilanes containing (a) at least 50 mol per cent methyltrichlorosilane and (b) diphenyldichlorosilane, said mixture being free of solvent and capable of forming a resin upon hydrolysis and condensation, which method comprises (1) providing a violently agitated zone in a hydrolysis medium consisting of ice and water and rapidly introducing the mixture of organohalogenosilanes into such zone while maintaining an amount of ice in said hydrolysis medium equal, by weight, to at least four times the weight of the mixture of organohalogenosilanes so as to maintain the temperature of the aforesaid hydrolysis medium substantially below 5° C. throughout the addition of the organohalogenosilanes, the concentration of the HCl resulting from the hydrolysis step being maintained below 12 per cent of the weight of the hydrolysis medium, and (2) separating the thereby formed water-insoluble polysiloxane to obtain an ethyl alcohol-soluble product.

ROBERT H. KRIEBLE.
JOHN R. ELLIOTT.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,222 | Rochow | Oct. 7, 1941 |
| 2,398,672 | Sauer | Apr. 16, 1946 |
| 2,437,204 | McGregor et al. | Mar. 2, 1948 |

OTHER REFERENCES

Robison et al.: J. Chem. Soc. (London), 1912, pp. 2146, 2147.

Meads et al.: J. Chem. Soc. (London), 1914, pp. 679, 682, and 684.

Meads et al.: J. Chem. Soc. (London), 1915, pp. 459, 463.